United States Patent
Kwon et al.

(10) Patent No.: US 10,019,807 B1
(45) Date of Patent: Jul. 10, 2018

(54) METHOD AND DEVICE FOR DETECTING CONNECTED PIXELS IN IMAGE

(71) Applicant: MVTECH CO., LTD., Gunpo-si (KR)

(72) Inventors: Ki Sun Kwon, Suwon-si (KR); Jong Hyun Song, Gunpo-si (KR)

( * ) Notice: Subject to any disclaimer, the term of this patent is extended or adjusted under 35 U.S.C. 154(b) by 0 days.

(21) Appl. No.: 15/832,738

(22) Filed: Dec. 5, 2017

(30) Foreign Application Priority Data

Mar. 31, 2017 (KR) ........................ 10-2017-0041599

(51) Int. Cl.
*G06K 9/64* (2006.01)
*G06T 7/32* (2017.01)

(52) U.S. Cl.
CPC ...................... *G06T 7/32* (2017.01)

(58) Field of Classification Search
CPC ........................................................ G06T 7/32
See application file for complete search history.

(56) References Cited

U.S. PATENT DOCUMENTS

| 4,791,676 A | * | 12/1988 | Flickner | ............... | G06K 9/4638 |
| | | | | | 382/204 |
| 5,204,914 A | * | 4/1993 | Mason | ................. | G06K 9/6202 |
| | | | | | 382/161 |
| 5,379,350 A | * | 1/1995 | Shimazu | ................... | G06T 7/13 |
| | | | | | 382/197 |
| 6,320,984 B1 | * | 11/2001 | Shigeta | .................... | G06K 9/48 |
| | | | | | 382/199 |
| 8,306,111 B2 | * | 11/2012 | Yang | .................... | G06K 9/4638 |
| | | | | | 348/143 |
| 2002/0126898 A1 | * | 9/2002 | Guo | ......................... | G06K 9/48 |
| | | | | | 382/199 |

FOREIGN PATENT DOCUMENTS

KR    10-2007-0035655    4/2007

OTHER PUBLICATIONS

English translation of 10-2007-0035655.

* cited by examiner

*Primary Examiner* — Jonathan S Lee
(74) *Attorney, Agent, or Firm* — Antonio Ha; U.S. Patent, LLC

(57) ABSTRACT

A method and device for detecting connected pixels in a two-dimensional (2D) image having a plurality of pixels each having X-Y coordinates may compare an upper-row pixel included in a Yth row with a lower-row pixel included in a Y+1th row depending on a comparison condition, wherein Y is a positive integer, and wherein when a difference in X coordinate between the upper-row pixel and the lower-row pixel is one or less, the upper-row pixel and the lower-row pixel are determined to be positioned adjacent each other, and when the difference in X coordinate is two or more, the upper-row pixel and the lower-row pixel are determined to be spaced apart from each other and update an index map that defines a relationship between index numbers of adjacent pixels depending on the determination to set pixels with the same or associated index number in the same pixel group.

11 Claims, 5 Drawing Sheets

METHOD AND DEVICE FOR DETECTING CONNECTED PIXELS IN IMAGE

CROSS-REFERENCE TO RELATED APPLICATIONS

This patent application claims priority under 35 U.S.C. § 119 to Korean Patent Application No. 10-2017-0041599, filed on Mar. 31, 2017, in the Korean Intellectual Property Office, the disclosure of which is incorporated by reference herein in its entirety.

TECHNICAL FIELD

Embodiments of the present disclosure concern pixel detection, and more particularly, to methods and devices for detecting pixels connected together in an image.

DISCUSSION OF RELATED ART

The pixels constituting a digital image may have different properties. Multiple pixels, together, may form a particular shape on the screen. In performing digital image processing or producing a machine vision system, adjacent pixels in the same image oftentimes need to be grouped together. Conventionally, adjacent or connected pixels are detected in such a manner that the pixels in the image are mapped to a two-dimensional (2D) plane, the X and Y coordinates of the pixels are stored in as many arrays in a memory as the pixels, and the absolute positions of the pixels are compared from each other.

Such conventional method, however, result in waste of memory and time because it requires coordinate saving and comparison on all of the pixels.

In particular, grouping on multiple images each having a number of pixels may significantly increase necessary memory volume and operation time, thus posing a limitation on adopting the conventional approach in high-speed, high-capacity image processing machine vision systems.

SUMMARY

According to an embodiment of the present disclosure, a method for detecting connected pixels in a two-dimensional (2D) image having a plurality of pixels each having X-Y coordinates may comprise comparing an upper-row pixel included in a Yth row with a lower-row pixel included in a Y+1th row depending on a comparison condition, wherein Y is a positive integer, and wherein when a difference in X coordinate between the upper-row pixel and the lower-row pixel is one or less, the upper-row pixel and the lower-row pixel are determined to be positioned adjacent each other, and when the difference in X coordinate is two or more, the upper-row pixel and the lower-row pixel are determined to be spaced apart from each other and updating an index map that defines a relationship for index numbers of adjacent pixels depending on the determination to set pixels with the same or associated index number in the same pixel group.

According to an embodiment of the present disclosure, the method may further comprise defining a plurality of indexed pixels by assigning the same index number to two or more horizontally adjacent ones of the pixels, storing the indexed pixels in a first array, generating the index map depending on the index numbers of the indexed pixels, obtaining memory addresses of leftmost pixels in rows among the plurality of indexed pixels, and storing the memory addresses in a second array.

According to an embodiment of the present disclosure, the comparison may include setting a U-th indexed pixel and a U+1th indexed pixel of the second array to the upper-row pixel and the lower-row pixel, respectively, wherein U is a positive integer.

According to an embodiment of the present disclosure, when an X coordinate of the upper-row pixel is smaller than an X coordinate of the lower-row pixel, an indexed pixel next to the upper-row pixel in the first array may be set as the upper-row pixel, and when a Y coordinate of the upper-row pixel is identical or larger than a Y coordinate of the lower-row pixel, an indexed pixel next to the lower-row pixel may be set as the lower-row pixel. When the upper-row pixel may be set as an indexed pixel of the second array, U is increased by one.

According to an embodiment of the present disclosure, when a difference in X coordinate between the upper-row pixel and the lower-row pixel is one or less, the index map may be updated with the smaller of an index number associated with the upper-row pixel and an index number associated with the lower-row pixel.

According to an embodiment of the present disclosure, the method may further comprise identifying the indexed pixels having the same or associated number by referring to the index map and obtaining a maximum value and a minimum value of the X coordinates of the identified indexed pixels and a maximum value and a minimum value of the Y coordinates of the identified indexed pixels to generate a rectangular pixel group.

According to an embodiment of the present disclosure, the index map may be updated by applying a function represented as below inversely from f(N) to f(1), wherein N is a maximum index number of the indexed pixels:

$$f(x) = \begin{cases} \text{if } T[x] \neq x, \text{ then } T[x] = f(T[x]) \\ \text{if } T[x] = x, \text{ then } T[x] = x \end{cases}.$$

According to an embodiment of the present disclosure, a device for detecting connected pixels in a 2D image including a plurality of pixels each of which has X and Y coordinates may comprise an indexing processor for assigning an index number to each of the plurality of pixels, generating one or more arrays, and storing information about the plurality of pixels, a pixel comparator for comparing an upper-row pixel included in a Yth row with a lower-row pixel included in a Y+1th row according to a comparison condition, determining that the upper-row pixel and the lower-row pixel are positioned adjacent each other when a difference in X coordinate between the upper-row pixel and the lower-row pixel is one or less and that the upper-row pixel and the lower-row pixel are spaced apart from each other when the difference in X coordinate is two or more, and updating an index map depending on the determination, the index map defining a relationship in index number between adjacent pixels, and a detector for setting a pixel group for pixels having the same or associated index number based on the updated index map.

According to an embodiment of the present disclosure, the indexing processor may include an array generator for assigning the same index number to two or more pixels that are positioned horizontally adjacent each other, defining a plurality of indexed pixels, storing the plurality of indexed pixels in a first array, extracting memory addresses for pixels having minimum X coordinates in rows among the plurality of indexed pixels, and storing the memory addresses in a second array and an index map generator for generating the indexed pixel according to index numbers of the plurality of indexed pixels.

According to an embodiment of the present disclosure, the pixel comparator may include a comparator for setting a Uth indexed pixel of the second array and a U+1th indexed pixel of the second array as the upper-row pixel and the lower-row pixel, respectively, and comparing the upper-row pixel with the lower-row pixel, wherein U is a positive integer and an updater for updating the index map with the smaller of the index numbers associated with the upper-row pixel and the lower-row pixel in the index map when the comparator determines that the difference in X coordinate between the upper-row pixel and the lower-row pixel is one or less.

According to an embodiment of the present disclosure, when the comparator determines that the X coordinate of the upper-row pixel is smaller than the X coordinate of the lower-row pixel, the comparator may reset the next indexed pixel in the corresponding row of the first array as the upper-row pixel and compare the reset upper-row pixel with the lower-row pixel. When the comparator determines that the Y coordinate of the upper-row pixel is equal or larger than the Y coordinate of the lower-row pixel, the comparator may reset the next indexed pixel in the corresponding row as the lower-row pixel and compare the upper-row pixel with the reset lower-row pixel. When an indexed pixel in the second array may be set as the upper-row pixel, the comparator increases U by one.

According to an embodiment of the present disclosure, the detector may identify a plurality of indexed pixels having the same or associated number by referring to the index map and extracts the maximum and minimum X coordinates and the maximum and minimum Y coordinates of the identified indexed pixels to create or draw a rectangle forming a pixel group.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the present disclosure will be described in detail with reference to the accompanying drawings. The same reference denotations may be used to refer to the same or similar elements throughout the specification and the drawings. The present disclosure, however, may be modified in various different ways, and should not be construed as limited to the embodiments set forth herein. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

The methods, processes, steps, operations, or schemes as disclosed herein may be implemented in software, hardware, or a combination thereof, and when implemented in software, the methods, processes, steps, operations, or schemes may be recorded, saved, stored retained, or implemented, individually, distributively, or in combination, in one or more physical memory or storage devices. As used herein, the term "unit." "module," or "system" may be, or an equivalent of, a computer-related entity, e.g., a hardware device, software program, an application or a combination, but without limited thereto.

Figure 1:
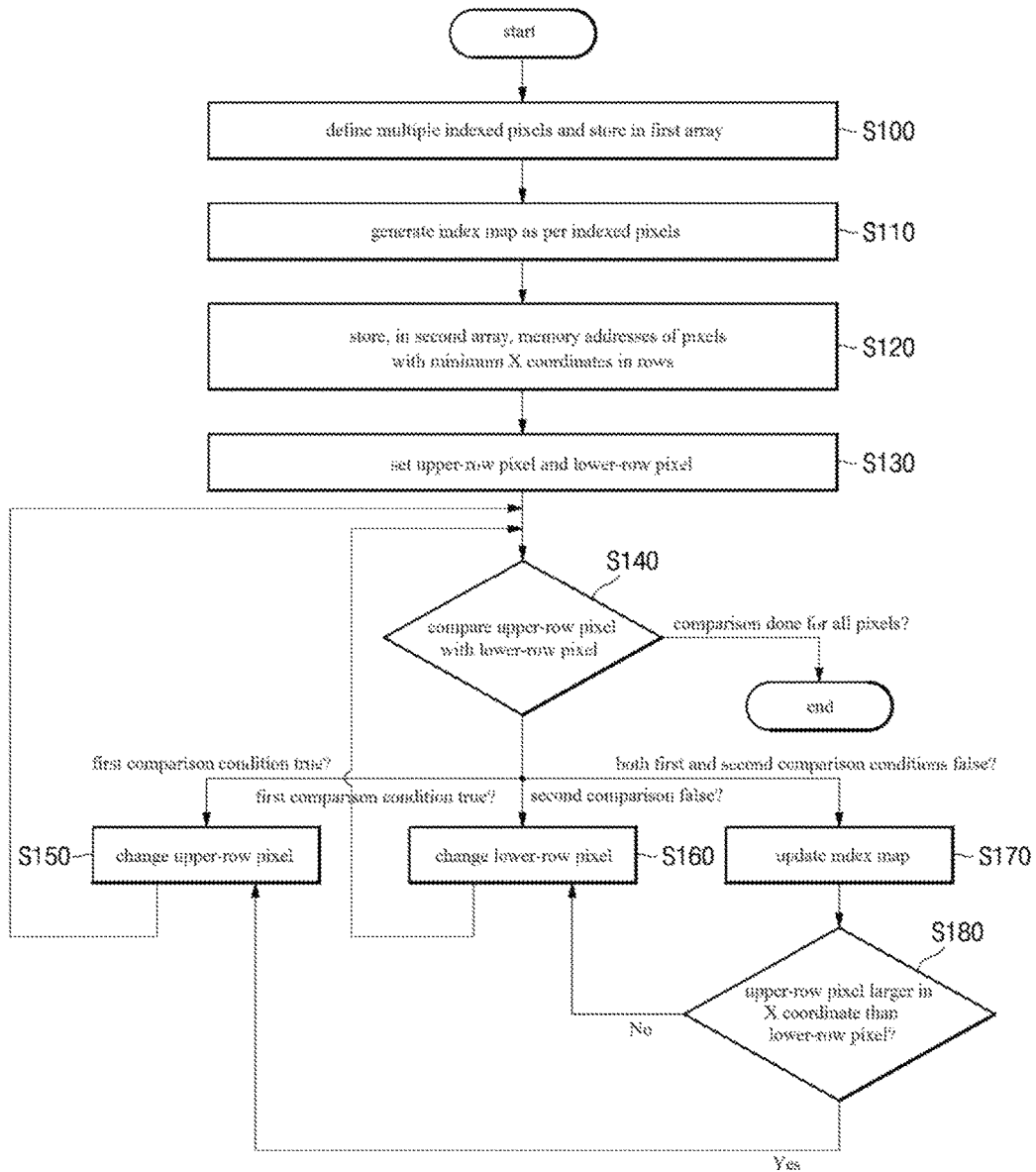
FIG. 1 is a flowchart illustrating a method for detecting connected pixels in an image according to an embodiment of the present disclosure.
Figure 2A:
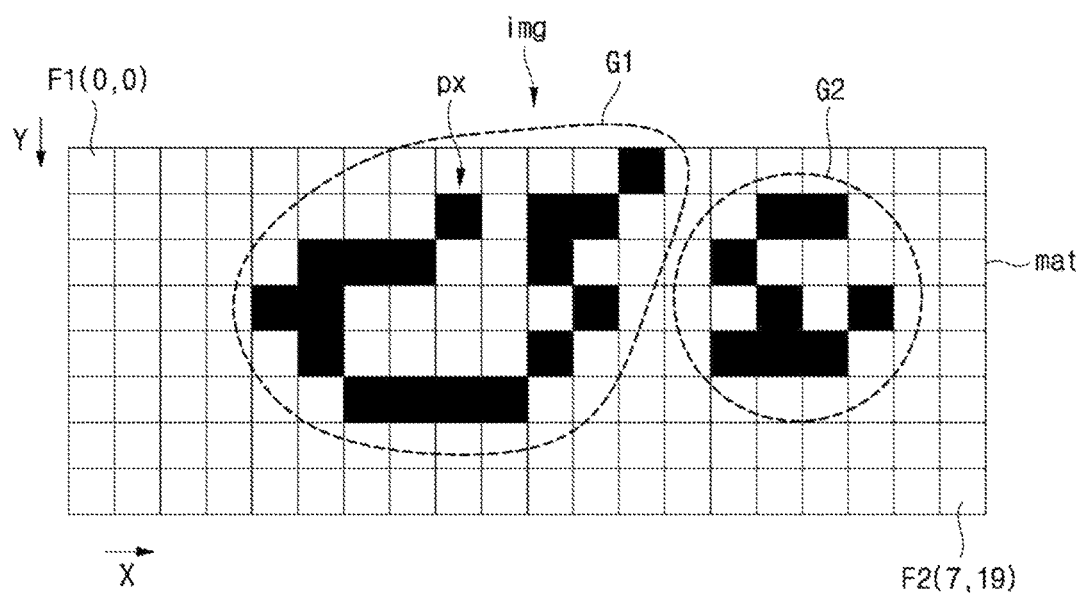
FIGS. 2a to 2c are views illustrating a method for detecting connected pixels in an image according to an embodiment of the present disclosure.
Figure 2B:
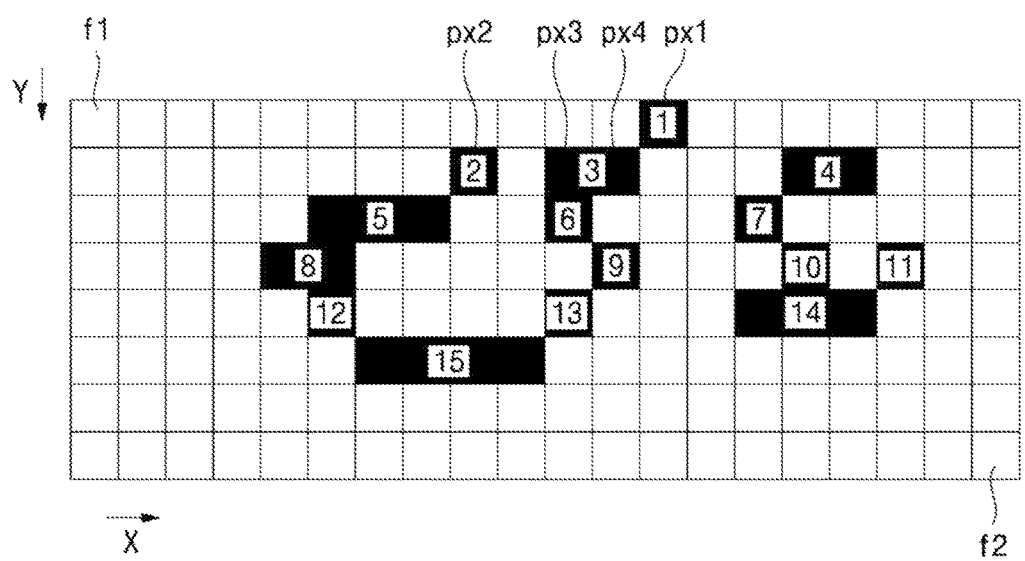
Figure 2C:
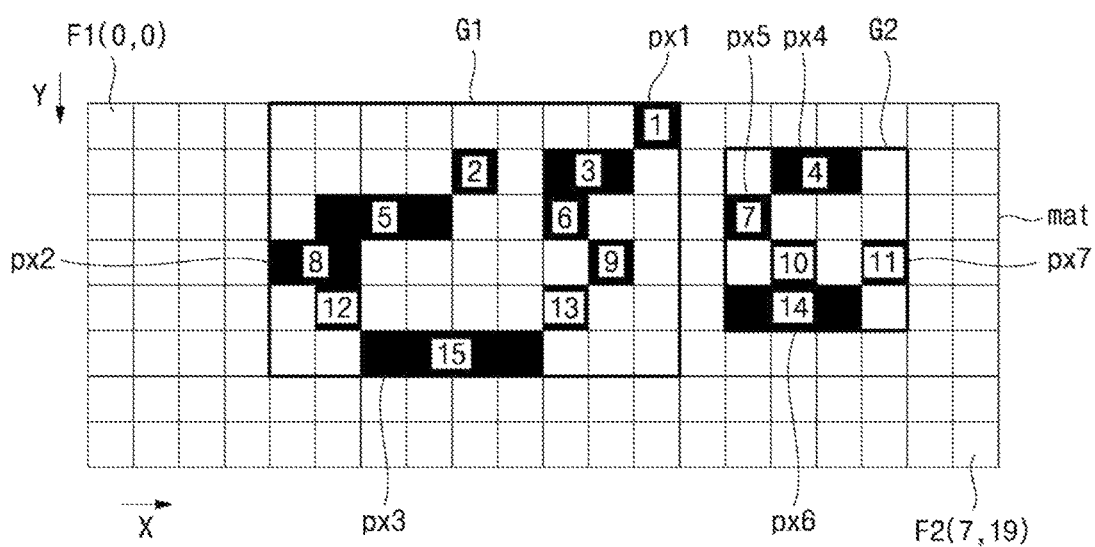
Figure 3:
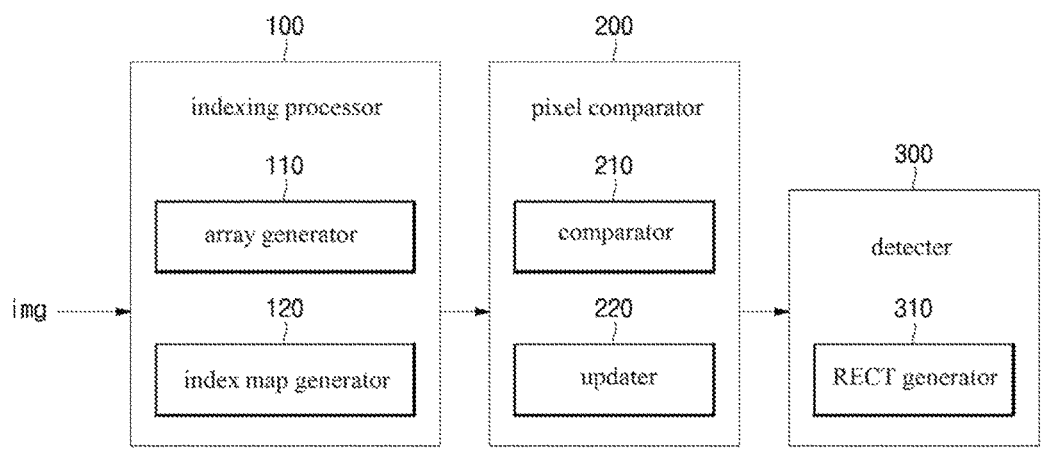
FIG. 3 is a block diagram illustrating a device for detecting connected pixels in an image according to an embodiment of the present disclosure.

FIG. 1 is a flowchart illustrating a method for detecting connected pixels in an image according to an embodiment of the present disclosure. FIGS. 2a to 2c are views illustrating a method for detecting connected pixels in an image according to an embodiment of the present disclosure. FIG. 3 is a block diagram illustrating a device for detecting connected pixels in an image according to an embodiment of the present disclosure.

As used herein, the image may be a gray image that has an 8-bit depth per pixel, the normal pixel may have a zero gray value, the target pixel, which is intended to be detected, may have a 255 gray value, and the image may be mapped to a two-dimensional (2D) plane that is sized to have 8 pixels in the X-axis and 20 pixels in the Y-axis for purposes of illustration.

The reference denotation 'px' may be used to refer to the corresponding pixel which may be assigned its number 'k,' where k is a positive integer. It should be noted that 'k' is a number arbitrarily assigned to identify the pixel and is different from an index number as used herein.

Unless stated otherwise, each step in the method of the present disclosure is performed by a device for detecting connected pixels in an image according to the present disclosure or one or more components of the device.

Referring to FIGS. 2a to 2c, an image may be divided into two groups G1 and G2 depending on how the pixels are connected together.

X-Y coordinates of a first pixel F1 may be (0,0), and X-Y coordinates of a last pixel F2 may be (7, 19). According to an embodiment of the present disclosure, the pixels in the same group are identified by comparing the index numbers assigned to the pixels px.

A structure (R{ }) is defined that may store rectangular-type information including elements, 'left,' 'top,' 'right,' and 'number' for the X and Y coordinates of each pixel px, and a first array (RR[ ]) is defined that may record information about each pixel.

The image is rendered to match, or map to, an X-Y coordinate two-dimensional (2D) plane (or matrix), and the right direction is defined as a direction along which the X coordinate increases, and the lower direction is defined as a direction along which the Y coordinate increases. As large a second array (RRR[ ]) as the size of the overall matrix is defined to store information that may indicate the address in memory (shortly, "memory address" for purposes of illustration) of the first array (RR[ ]).

Starting from the first pixel (F1) on the 2D plane, a detection process is performed on pixels corresponding to the image in the right direction of the X coordinates. The pixels on which the detection process is to be performed may be denoted 'target pixels.' When done with one row, the process continues on the next row, and in this way, the process proceeds up to the last pixel f2.

Referring to FIG. 2b, upon detecting a first pixel corresponding to the image, the first pixel px is indexed 1, and the current X coordinate, the current Y coordinate, and the current index, respectively, are recorded in the RR[index].Left, RR[index].Top, and RR[index].Number of the first array (RR[ ]), in which case the RR[index].Left, RR[index].Top, and RR[index].Number may be denoted as, e.g., RR[1],Left, RR[1].Top, and RR[1].Number.

For purposes of description, the reference denotations 'm' and 'n,' respectively, may be used to denote a reference pixel and a comparison pixel in the first array (RR[ ]), where m and n are positive integers, and m<n. The reference denotation 'U' may be used to refer to an indexed pixel in the second array (RRR[ ]), where U is a positive integer.

Accordingly, the values are recorded in the first array (RR[ ]), as shown in Table 1 below. In this case, the resource allocation may be denoted as, e.g., RR[1].

TABLE 1

| Array/Variable name | value |
|---|---|
| Index | 1 |
| RR[index].Left | 12 |
| RR[index].Top | 0 |
| RR[index].Number | 1 |
| RR[index].Right | 12 |

The process goes on in the right and lower directions. When there is a pixel adjacent to the right side of the first pixel, the adjacent pixel is indexed the same index number as the previous pixel (i.e., the first pixel), and when the right adjacent pixel is absent or disappears, the current X coordinate is recorded in the RR[index].Right.

In other words, pixels connected together to the left or right are indexed the same value.

The memory addresses of the indexed pixels with the minimum X coordinates in the rows, e.g., the leftmost (target) pixels on the 2D plane, may be recorded in the second array (RRR[ ]).

The numbers for the pixels as shown in FIG. 2b indicate index numbers for the pixels. For example, the first pixel px1 and a second pixel px2 are spaced apart from each other, and are thus indexed different index numbers (e.g., 1 and 2, respectively), and a third pixel px3 and a fourth pixel px4 are positioned adjacent each other and are thus indexed the same index number, i.e., 3.

When the process is performed on the last pixel f2, the pixels are indexed with index numbers 1 to 15. As the index numbers for the first pixels, i.e., the first pixel px1 and the second pixel p2, in the rows of the second array (RRR[ ]) are recorded, the second array (RRR[ ]) with the values shown in Table 2 below may be generated.

TABLE 2

| Array/Variable name | Value |
|---|---|
| RRR[1] | &RR[1] |
| RRR[2] | &RR[2] |
| RRR[3] | &RR[5] |
| RRR[4] | &RR[8] |
| RRR[5] | &RR[12] |
| RRR[6] | &RR[15] |

In the above example, as the pixels are indexed 1 to 15, the index numbers are set as identification (ID) numbers, and an array-type of index map T is generated corresponding to the number of the index numbers. When generating the index map T, default values associated with the ID numbers may be recorded in the Numbers. For example, an initial form of such index map may briefly be represented in Table 3 below.

TABLE 3

| ID number | | | | | | | | | | | | | | |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |
| Number 1 | 2 | 3 | 4 | 5 | 6 | 7 | 8 | 9 | 10 | 11 | 12 | 13 | 14 | 15 |

Thereafter, an indexed pixel that comes first in order in the second array (RRR[ ]) may be set as an upper-row pixel (RRR[U]), and an indexed pixel that comes next in order in the second array (RRR[ ]) may be set as a lower pixel (RRR[U+1]). Comparison may sequentially be made between such upper-row pixels (RRR[U]) and lower-row pixels (RRR[U+1]) while changing the indexed pixels in each row depending on comparison conditions, thereby performing comparison on all the indexed pixels.

For example, comparison may be performed between the upper-row pixel (RRR[1], RR[1]) which comes first in the second array (RRR[ ]) and the lower-row pixel (RRR[2], RR[2]) which comes next in the second array (RRR[ ]) while changing the pixels depending on conditions. In this case, the pixels subject to comparison are changed with respect to the first array (RR[ ]).

The following conditions for determination may apply in comparing the upper-row pixel with the lower-row pixel. The conditions may include a first condition and a second condition.

The first condition may be a condition to determine whether the right value (RR[m].Right) of the upper-row pixel (RRR[U], RR[m]) is the same or larger than the left value (RR[n].Left) of the lower-row pixel (RRR[U+1], RR[n]) minus 1. i.e., 'Left-1.'

The second condition may be a condition to determine whether the left value (RR(m).Left) of the upper-row pixel (RRR[U], RR[m]) is larger than the right value (RR[n] .Right) of the lower-row pixel (RRR[U+1], RR[n]).

When the first condition is met, m may be increased by one, and the next pixel (RR[m+l]) is set as the reference pixel and may then be compared with the lower-row pixel (RR[n]).

When m is increased and thus the upper-row pixel (RRR [U], RR[m]) is the same as the pixel (RRR[U+1], the comparison on the pixels in the row may be terminated, the next pixel (RRR[U+I]) in the second array (RRR[ ]) is set as the upper-row pixel while the pixel (RRR[U+2]) is set as the lower-row pixel, and the comparison process continues on the pixels RRR[U+1] and RRR[U+2].

When the first condition is met but the second condition is not, n may be increased by one so that the next lower-row pixel RR[n+1] may be set as the comparison pixel, and the comparison process may continue on the lower-row pixel RR[n+1].

When neither the first condition nor the second condition is met, the upper-row pixel RR[m] and the lower-row pixel RR[n] may be determined to be positioned adjacent each other in which case the index map T may be updated with the smaller of the Numbers corresponding to the index numbers of the indexed pixels according to an update process as set forth below.

The Number of the reference pixel RR[1] may be defined as a first condition variable C1, the Number of the comparison pixel RR[3] may be defined as a second condition variable C2, and the index map T may be updated as per the following update conditions.

The update conditions may include a first update condition and a second update condition.

As the first update condition, when the first condition variable C1 is the same or smaller than the second condition variable C2 (C1≤C2), a Number of T[C2] is defined as a first temporary variable K1, a Number of T[K1] as a second temporary variable K2, and a Number of T[C1] as a third temporary variable K3 for the index map T. The Number of T[K2] is changed to the third temporary variable K3, the Number of T[K1] is changed to the third temporary variable K3, and the Number of T[C2] is changed to the third temporary variable T3. Further, the Number of the reference pixel RR[1], i.e., RR[m].Number, is changed to the third temporary variable K3.

As the second update condition, when the first condition variable C1 is larger than the second condition variable C2 (C1>C2), the Number of T[C1] is defined as the first temporary variable K1, the Number of T[K1] is defined as the second temporary variable K2, and the Number of T[C2] is defined as the third temporary variable K3 for the index map T. The Number of T[K2] is changed to the third temporary variable K3, the Number of T[K1] is changed to the third temporary variable K3, and the Number of T[C1] is changed to the third temporary variable K3.

Further, the Number of the comparison pixel, i.e., RR[n].Number, is changed to the third temporary variable K3.

The variables according to the first and second update conditions may be summarized in Table 4 below. In Table 4, the arrow '→' denotes substituting values.

TABLE 4

|  | First update condition (C1 ≤ C2) | Second update condition (C1 > C2) |
|---|---|---|
| Common conditions | RR[m]→C1, RR[r]→C2 | |
| Variable definitions | T[C2]→K1 | T[C1]→K1 |
|  | T[K1]→K2 | T[K1]→K2 |
|  | T[C1]→K3 | T[C2]→K3 |
| Change values | K3→T[K2] | K3→T[K2] |
|  | K3→T[K1] | K3→T[K1] |
|  | K3→T[C2] | K3→T[C1] |
| Change first array RR[ ] | K3→RR[m].Number | K3→RR[n].Nmnber |

When the first condition variable C1 is equal or smaller than the second condition variable C2 as a result of the comparison under the update conditions, the first update condition is met, and otherwise, the second update condition is met. The update process is performed as such.

After the update process as per the first or second update condition is complete, it is determined whether RR[m].Right is smaller than RR[n].Right, and if so, m is increased, and the comparison process continues. Otherwise, n is increased by one, and the comparison process goes on.

In the above example, the first condition is not met, but the second condition is met in comparing the upper-row pixel RR[I] and the lower-row pixel RR[2]. Thus, n is increased, the next pixel, i.e., the pixel RR[3], is set as the comparison pixel, and comparison is performed between the upper-row pixel RR[ ] and the pixel RR[3].

As a result of the comparison between the upper-row pixel RR[1] and the comparison pixel RR[3], neither the first condition nor the second condition is met. Thus, the pixels RR[1] and RR[3] may be determined to be positioned vertically adjacent each other. In this case, the Numbers of the ID numbers for the two pixels are updated in the index map T.

Thus, the first condition variable C1 becomes 1, the second condition variable C2 becomes 3, and according to the variable definitions by the first update condition, the first temporary variable K1, the second temporary variable K2, and the third temporary variable K3, respectively, become 3, 3, and 1, and according to the Number changes, T[K2], T[K1], and T[C2], i.e., T[3], become 1 as shown in Table 4. The Number of the reference pixel, i.e., RR[1].Number, remains 1.

Such changes are shown in Table 5 below.

TABLE 5

| ID number | | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Number | 1 | 2 | 1 | 4 | 5 | 6 | 7 | 8 | 9 | 10 | 11 | 12 | 13 | 14 | 15 |

Next, as RR[1].Right is larger than RR[3].Right, n is increased, and the comparison process continues.

Accordingly, as the above-described first condition is met when comparison is performed between the upper-row pixel RR[1] and the lower-row pixel RR[4], m is increased so that the upper-row pixel is changed to RR[2] which is then compared with the pixel RR[5] indicated by RRR[U+1]. As a result, the first and second conditions fail to be met, and the index map T is updated, m is increased by one to change the upper-row pixel to the pixel RR[3] that is then compared with the current lower-row pixel RR[6].

Referring to Tables 4 and 5, as the first and second condition variables C1 and C2, respectively, are changed to 2 and 5, the first update condition is met, and according to the variable definitions, the first temporary variable K1, the second temporary variable K2, and the third temporary variable K3, respectively, become 5, 5, and 2, and according to the changes in number, T[K2], T[K1], and T[C2], i.e., T[2], become 2. The Number of the reference pixel, i.e., RR[4].Number, remains 2.

When the above-described process is performed on all the indexed pixels RR[1] to RR[15], the indexed pixels are set in the form shown in FIG. 2b, and a resultant form of the index map may briefly be represented as in Table 6 below.

TABLE 6

| ID number | | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Number | 1 | 1 | 1 | 4 | 2 | 1 | 4 | 2 | 1 | 4 | 4 | 2 | 1 | 4 | 2 |

In Table 6, the Number corresponding to each ID number represents the group where the indexed pixel belongs. As an example, since ID number 1 corresponds to Number 1, it denotes a pixel connected (or adjacent) to the indexed pixel RR[1] indexed 1. Since ID number 8 corresponds to Number 2, and the indexed pixel RR[2] indexed 2 is connected to the indexed pixel RR[1] indexed 1, the indexed pixel RR[8] indexed 8 may be connected to the indexed pixel RR[1] indexed 1.

Now described is an example of a compensation process.

The index map T reflects the values or numbers associated with the pixels of the image. An exception may occur to the index map T for complicated images with myriad pixels. To prevent such exception from arising, a predetermined process may be used to compensate for the index map T. The compensation process may be represented in the following equation or function:

$$f(x) = \begin{cases} \text{if } T[x] \neq x, \text{ then } T[x] = f(T[x]) \\ \text{if } T[x] = x, \text{ then } T[x] = x \end{cases}$$

Here, x refers to the index number of the current indexed pixel.

The equation or function may be performed inversely from f(N) to f(1), where N is the maximum value of the indexed pixel.

When the above compensation process is complete, the pixel group for each pixel is determined.

To that end, the Left, Right, Top, and Bottom of each pixel are updated from the first indexed pixel RR[1] to the Nth indexed pixel RR[N].

For example, when the Number of the xth indexed pixel RR[x] is J, and T[J] is a value or number that comes first, one new RECT (rectangular)-type of data is generated, and the RR[x].Left, RR[x].Right, and RR[x].Top of the current indexed pixel RR[x] are allocated to the member corresponding to the RECT (rectangular) type.

Unless the T[J] is the one that comes first, corresponding RECT data may be fetched, and the value of the corresponding RECT member is updated with the smallest of the RECT.Left, RR[x].Left, and RR[x].Right, the smallest of the RECT.Top and RR[x].Top, and the largest of the RECT.Right, RR[x].Left, and RR[x].Right. Further, the value of the corresponding RECT member is updated with the smallest of the RECT.bottom, RR[x].Top, and RR[x].bottom.

Referring to FIGS. 1 and 2c, the coordinates of the uppermost, lowermost, leftmost, and rightmost pixels among the pixels divided in the same groups according to the index map may be used to determine the pixel groups. For example, in defining the area of the first group G1, the data may be updated with the top and right values, RR[1].Top, RR[1].Right of the first indexed pixel RR[1], px1, the left value RR[8].Left of the eighth indexed pixel RR[8], px2, and the top value RR[15].Top of the fifteenth indexed pixel RR[15], px3, enabling the pixel group to be distinguished from another.

Further, in defining the area of the second group G1, the data may be updated with the top value RR[4].Top of the fourth indexed pixel RR[4], the left value RR[7].Left or RR[14].Left of the seventh indexed pixel RR[7], px5 or the $14^{th}$ indexed pixel RR[14], px6, the right value RR[11].Right of the $11^{th}$ indexed pixel RR[I], px7, and the top value RR[14].Top of the $14^{th}$ indexed pixel RR[14], px6, enabling the pixel group to be distinguished from another.

By the above-described method or processes, the pixels connected together in the image may be detected as a rectangular area with minimum memory usage and comparison process.

Now described is a device for detecting connected pixels in an image according to an embodiment of the present disclosure. The device may be implemented as a hardware device or a software program or application run on a computing device, created in a programming language, and recorded in a recording medium.

FIG. 3 is a block diagram illustrating a device for detecting connected pixels in an image according to an embodiment of the present disclosure.

The device may detect connected pixels in a 2D image that includes a plurality of pixels each of which has X-Y coordinates.

The device may include an indexing processor 100, a pixel comparator 200, and a detector 300.

The indexing processor 100 may index the plurality of pixels, e.g., assigning index numbers to the pixels, generate one or more arrays and store information about the pixels in the arrays, creating an index map for identifying connected pixels that are to be detected.

The indexing processor 100 may include an array generator 110 and an index map generator 120.

The array generator 110 may assign an index number to each pixel in which case two or more pixels positioned horizontally (e.g., in a left or right direction) adjacent each other are assigned the same index number, thereby defining a plurality of indexed pixels. The array generator 110 may store the indexed pixels, or information about the indexed pixels, in the first array. The array generator 110 may obtain or extract memory addresses for the pixels with the minimum X coordinates in the rows, i.e., the leftmost indexed pixels in the rows, from the indexed pixels and store the memory addresses in the second array.

The index map generator 120 may generate an index map T according to the index numbers of the indexed pixels.

The index map may define a relationship in index number between adjacent pixels depending on the determination made by the pixel comparator 200.

The pixel comparator 200 may compare upper-row pixels in a Yth row with lower-row pixels in a Y+1th row according to comparison conditions. For example, the pixel comparator 200 may determine that an upper-row pixel and a lower-row pixel are positioned adjacent to each other when a difference in X coordinate between the upper-row pixel and the lower-row pixel is one or less and that the upper-row pixel and the lower-row pixel are spaced apart from each other when the difference in X coordinate is two or more.

To determine the nature or characteristics of the indexed pixels, the pixel comparator 200 may set each indexed pixel as an upper-row pixel or lower-row pixel depending on the position of the indexed pixel and compare the upper-row pixel with the lower-row pixel.

The pixel comparator 200 may include a comparator 210 and an updater 220.

The comparator 210 may set a Uth indexed pixel of the second array and a U+1th indexed pixel of the second array as an upper-row pixel and a lower-row pixel, respectively, and compare the upper-row pixel with the lower-row pixel to determine a difference in X coordinate between the upper-row pixel and the lower-row pixel.

When the comparator 210 determines that the difference in X coordinate between the upper-row pixel and the lower-row pixel is one or less, the updater 220 may update the index map T with the smaller of the Numbers associated with the upper-row pixel and the lower-row pixel.

When the comparator 210 determines that the X coordinate of the upper-row pixel is smaller than the X coordinate of the lower-row pixel, the comparator 210 may reset the next indexed pixel in the corresponding row of the first array as the upper-row pixel and compare the reset upper-row pixel with the lower-row pixel.

When the comparator 210 determines that the Y coordinate of the upper-row pixel is equal or larger than the Y coordinate of the lower-row pixel, the comparator 210 may reset the next indexed pixel in the corresponding row as the lower-row pixel and compare the upper-row pixel with the reset lower-row pixel. When an indexed pixel in the second array is set as the upper-row pixel, the comparator 210 may increase U by one.

The detector 300 may detect connected pixels using the index map updated according to the results of the comparison between pixels by the pixel comparator 200.

The detector 300 may identify a plurality of indexed pixels having the same or associated number by referring to the index map.

The detector 300 may include a RECT (rectangle) generator 310 that may extract the maximum and minimum X coordinates and the maximum and minimum Y coordinates of the identified indexed pixels to create or draw a rectangle forming a pixel group.

According to the embodiments of the present disclosure, each pixel in an image may be assigned an index number, and an index map may be created using the index numbers. The pixels mapped to a 2D plane may sequentially be compared in pair to determine whether they are positioned adjacent each other. Depending on contexts, the upper-row pixel or the lower-row pixel may alternately be changed in comparison. This way may save memory and comparison count.

The device or each component of the device may be implemented in a hardware device or in a software program or application. When the device or each component of the device is implemented in a software program or application, the software program or application may be stored in a memory or storage device in a computer-readable format, e.g., RAM, ROM, CD-ROM, or other various storage devices.

While the present disclosure has been shown and described with reference to exemplary embodiments thereof, it will be apparent to those of ordinary skill in the art that various changes in form and detail may be made thereto without departing from the spirit and scope of the present disclosure as defined by the following claims.

What is claimed is:

1. A method for detecting connected pixels in a two-dimensional (2D) image having a plurality of pixels each having X-Y coordinates, the method comprising:
   comparing an upper-row pixel included in a Yth row with a lower-row pixel included in a Y+1th row depending on a comparison condition, wherein Y is a positive integer, and wherein when a difference in X coordinate between the upper-row pixel and the lower-row pixel is one or less, the upper-row pixel and the lower-row pixel are determined to be positioned adjacent each other, and when the difference in X coordinate is two or more, the upper-row pixel and the lower-row pixel are determined to be spaced apart from each other; and
   updating an index map that defines a relationship between index numbers of adjacent pixels depending on the determination to set pixels with the same or associated index number in the same pixel group, wherein updating the index map includes:
      identifying the indexed pixels having the same or associated number by referring to the index map; and
      obtaining a maximum value and a minimum value of the X coordinates of the identified indexed pixels and a maximum value and a minimum value of the Y coordinates of the identified indexed pixels to generate a rectangular pixel group.

2. The method of claim 1, further comprising:
   defining a plurality of indexed pixels by assigning the same index number to two or more horizontally adjacent ones of the pixels;
   storing the indexed pixels in a first array;
   generating the index map depending on the index numbers of the indexed pixels;
   obtaining memory addresses of leftmost pixels in rows among the plurality of indexed pixels; and
   storing the memory addresses in a second array.

3. The method of claim 2, wherein the comparison includes:
   setting a U-th indexed pixel and a U+1th indexed pixel of the second array to the upper-row pixel and the lower-row pixel, respectively, wherein U is a positive integer.

4. The method of claim 3, wherein when an X coordinate of the upper-row pixel is smaller than an X coordinate of the lower-row pixel, an indexed pixel next to the upper-row pixel in the first array is set as the upper-row pixel, and when a Y coordinate of the upper-row pixel is identical or larger than a Y coordinate of the lower-row pixel, an indexed pixel next to the lower-row pixel is set as the lower-row pixel, and wherein when the upper-row pixel is set as an indexed pixel of the second array, U is increased by one.

5. The method of claim 4, wherein when a difference in X coordinate between the upper-row pixel and the lower-row pixel is one or less, the index map is updated with the smaller of an index number associated with the upper-row pixel and an index number associated with the lower-row pixel.

6. The method of claim 1, wherein the index map is updated by applying a function represented as below inversely from f(N) to f(1), wherein N is a maximum index number of the indexed pixels:

$$f(x) = \begin{cases} \text{if } T[x] \neq x, \text{ then } T[x] = f(T[x]) \\ \text{if } T[x] = x, \text{ then } T[x] = x \end{cases},$$

wherein T[x] is the index map, and x is an index value of a current index.

7. A device for detecting connected pixels in a 2D image including a plurality of pixels each of which has X and Y coordinates, the device comprising:
   an indexing processor for assigning an index number to each of the plurality of pixels, generating one or more arrays, and storing information about the plurality of pixels;
   a pixel comparator for comparing an upper-row pixel included in a Yth row with a lower-row pixel included in a Y+1th row according to a comparison condition, determining that the upper-row pixel and the lower-row pixel are positioned adjacent each other when a difference in X coordinate between the upper-row pixel and the lower-row pixel is one or less and that the upper-row pixel and the lower-row pixel are spaced apart from each other when the difference in X coordinate is two or more, and updating an index map depending on the determination, the index map defining a relationship in index number between adjacent pixels; and
   a detector for setting a pixel group for pixels having the same or associated index number based on the updated index map, identifying a plurality of indexed pixels having the same or associated number by referring to the index map, and extracting the maximum and minimum X coordinates and the maximum and minimum Y coordinates of the identified indexed pixels to create or draw a rectangle forming a pixel group.

8. The device of claim 7, wherein the indexing processor includes:

an array generator for assigning the same index number to two or more pixels that are positioned horizontally adjacent each other, defining a plurality of indexed pixels, storing the plurality of indexed pixels in a first array, extracting memory addresses for pixels having minimum X coordinates in rows among the plurality of indexed pixels, and storing the memory addresses in a second array; and an index map generator for generating the indexed pixel according to index numbers of the plurality of indexed pixels.

9. The device of claim 8, wherein the pixel comparator includes:

a comparator for setting a Uth indexed pixel of the second array and a U+1th indexed pixel of the second array as the upper-row pixel and the lower-row pixel, respectively, and comparing the upper-row pixel with the lower-row pixel, wherein U is a positive integer; and an updater for updating the index map with the smaller of the index numbers associated with the upper-row pixel and the lower-row pixel in the index map when the comparator determines that the difference in X coordinate between the upper-row pixel and the lower-row pixel is one or less.

10. The device of claim 9, wherein when the comparator determines that the X coordinate of the upper-row pixel is smaller than the X coordinate of the lower-row pixel, the comparator resets the next indexed pixel in the corresponding row of the first array as the upper-row pixel and compare the reset upper-row pixel with the lower-row pixel, wherein when the comparator determines that the Y coordinate of the upper-row pixel is equal or larger than the Y coordinate of the lower-row pixel, the comparator resets the next indexed pixel in the corresponding row as the lower-row pixel and compare the upper-row pixel with the reset lower-row pixel, and wherein when an indexed pixel in the second array is set as the upper-row pixel, the comparator increases U by one.

11. The device of claim 10, wherein when a difference in X coordinate between the upper-row pixel and the lower-row pixel is one or less, the updater updates the index map with the smaller of an index number associated with the upper-row pixel and an index number associated with the lower-row pixel.

* * * * *